Jan. 11, 1938.   C. S. ASH   2,105,176
BRAKE CONSTRUCTION
Filed March 18, 1935   2 Sheets-Sheet 1
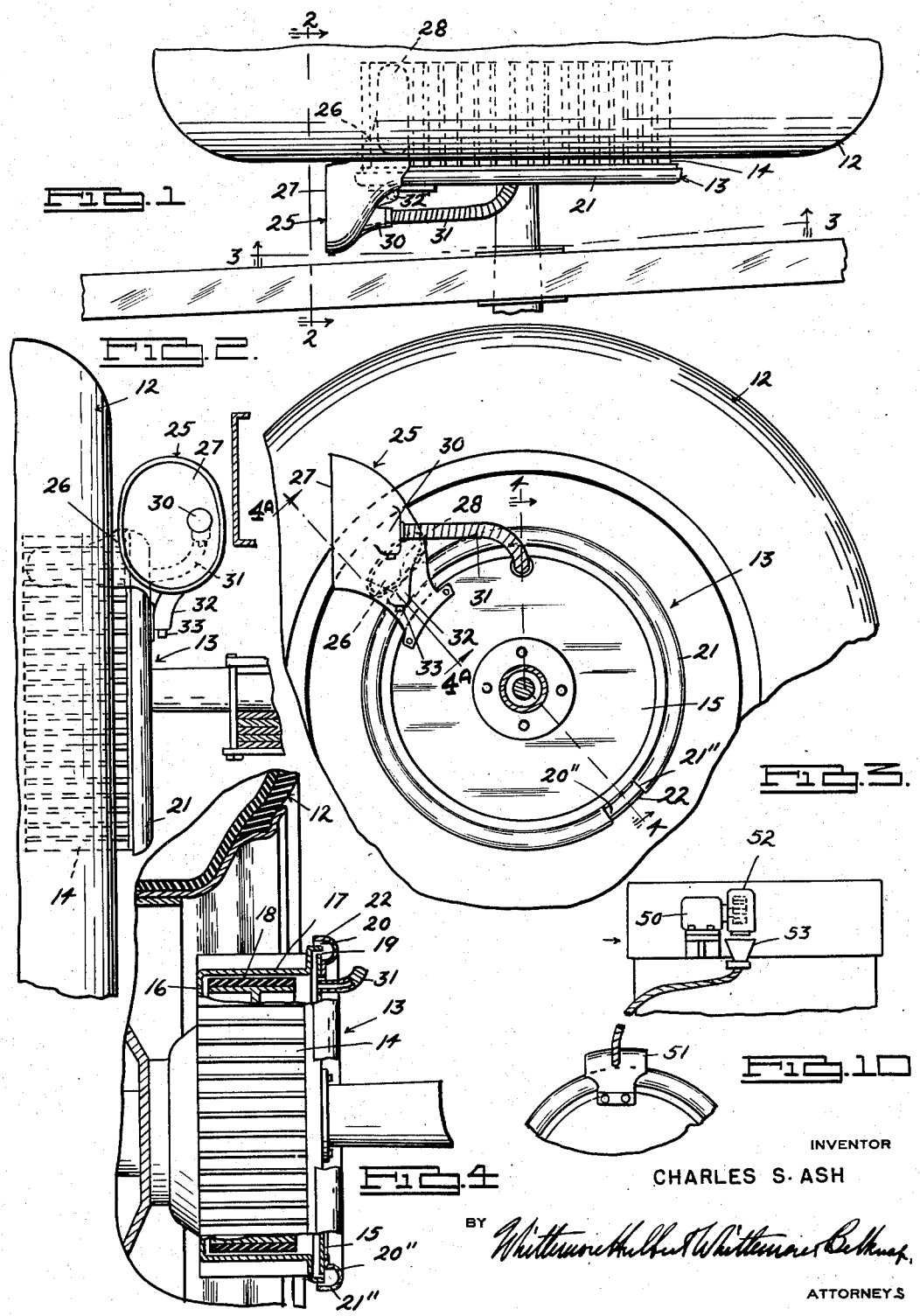
INVENTOR
CHARLES S. ASH
BY
ATTORNEYS Jan. 11, 1938.    C. S. ASH    2,105,176
BRAKE CONSTRUCTION
Filed March 18, 1935    2 Sheets-Sheet 2
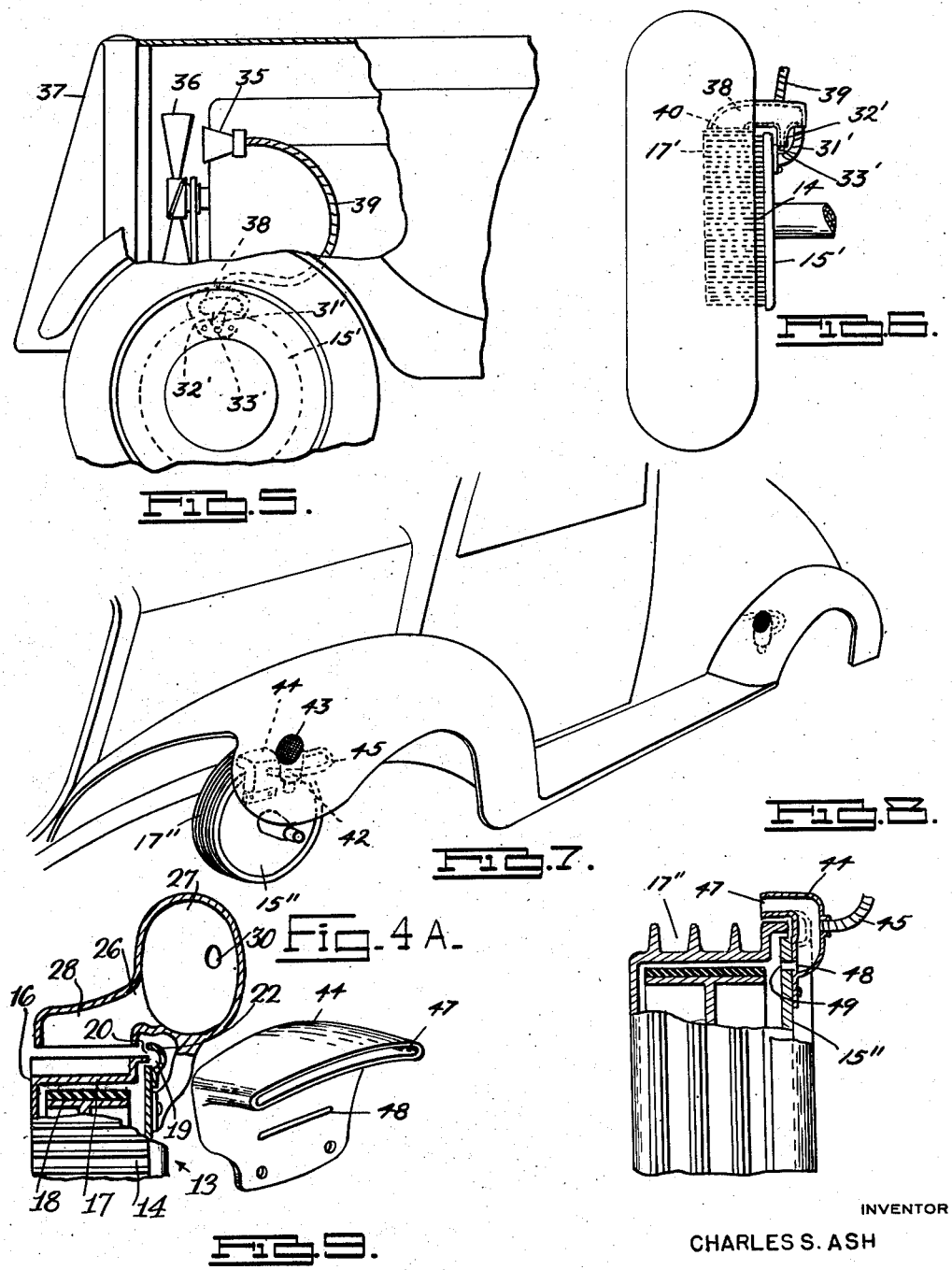
INVENTOR
CHARLES S. ASH
BY
ATTORNEYS Patented Jan. 11, 1938

2,105,176

UNITED STATES PATENT OFFICE 2,105,176

BRAKE CONSTRUCTION

Charles S. Ash, Milford, Mich., assignor to Kelsey-Hayes Wheel Company, Detroit, Mich., a corporation of Delaware Application March 18, 1935, Serial No. 11,718

14 Claims. (Cl. 188—264)

This invention relates generally to brake constructions and refers more particularly to means for cooling brakes of the type employed in association with the road engaging wheels of motor vehicles.

The operating temperature of the brake drum and associated brake shoes of a motor vehicle is highly critical in obtaining efficient brake performance, and the problem of maintaining this temperature within a satisfactory operating range under all conditions of driving is greatly aggravated by the steadily increasing demand for motor vehicles capable of higher sustained speeds, and by the inability of the air to circulate in close proximity to the brakes of vehicles of modern design, due to the fact that the brakes are substantially enclosed by sheet metal work, and by the small diameter tires usually having a relatively large cross sectional area.

One of the principal objects of this invention is to effect more efficient brake operation by artificially cooling the brakes, or by actually directing a stream of cooling medium in the region of the brakes, so that the heat generated thereby will be effectively dissipated, with the result that drum expansion and consequent fading of the brakes is practically eliminated. Lowering the operating temperature of the brakes by effectively cooling the same, not only appreciably increases the efficiency of operation thereof, but also renders it possible to utilize a brake drum formed of less expensive metals than heretofore required to withstand the extremely higher brake operating temperatures incurred in the past. As a matter of fact, the present invention renders it possible to obtain commercially satisfactory brake operation by employing a relatively inexpensive stamped drum, instead of the costly composite drums heretofore employed to obtain the thermal conductivity required to dissipate the heat generated with any degree of rapidity.

Another advantageous feature of the present invention resides in the provision of a cooling system for vehicle brakes operable to not only direct a stream of cooling medium on the exterior surface of the drum as it revolves with the road engaging wheel, but to also direct a stream of air into the interior of the drum, so as to insure maintaining the brake friction means at a relatively low temperature. Discharging air into the drum also has the function of maintaining the interior of the drum relatively clean, due to the fact that the air will blow out any dirt or abrasive material that may accumulate in the drum.

The foregoing, as well as other objects, will be made more apparent as this description proceeds, especially when considered in connection with the accompanying drawings, wherein:

Figure 1 is a diagrammatic plan view of a portion of a motor vehicle chassis equipped with a brake having my improved cooling means in association therewith;

Figure 2 is a sectional view taken substantially on the line 2—2 of Figure 1;

Figure 3 is a sectional view taken substantially on the plane indicated by the line 3—3 of Figure 1;

Figure 4 is a sectional view taken on the line 4—4 of Figure 3;

Figure 4A is a sectional view taken substantially on the line 4A—4A of Figure 3.

Figure 5 is a diagrammatic view of a motor vehicle showing a slightly modified form of construction;

Figure 6 is a fragmentary front elevational view of one of the brakes shown in Figure 5, with certain parts broken away for the sake of clearness;

Figure 7 is a fragmentary perspective view of another modified form of construction;

Figure 8 is a sectional view through one of the brakes shown in Figure 7;

Figure 9 is a perspective view of the air distributing member shown in Figure 8; and Figure 10 is a semi-diagrammatic view illustrating still another modified form of construction.

Referring now to the drawings, it will be noted that there is illustrated in Figure 1 a portion of a motor vehicle having a road engaging wheel 12 equipped with a brake 13 of the internal expanding type having a drum 14 secured to the road engaging wheel 12 for rotation therewith and having a backing plate 15 fixed against rotation. The drum 14 is provided with a web 16 secured in any suitable manner to the wheel 12 and having an axially rearwardly extending annular brake flange 17. The outer surface of the flange is provided with radially extending heat radiating fins and the inner surface is adapted to be engaged by suitable friction means 18 mounted upon the backing plate 15 within the drum. In accordance with conventional practice, the friction means is supported upon the backing plate 15 with the friction surface normally spaced a slight distance from the inner annular surface of the brake flange and expansion of the friction means to engage the surface aforesaid thereof with the brake flange may be accomplished by any of the well known actuating means heretofore employed for this purpose.

In the present instance, the rear end of the annular brake flange 17 is fashioned to provide an annular recess 19 for receiving the periphery of the backing plate, and the construction is such as to insure a clearance between the peripheral portions of the fixed backing plate and the adjacent surface of the revoluble drum, so that the former will not interfere with the rotation of the latter. The clearance thus provided forms an annular opening 20, and this opening is shielded by a guard 21 secured to the backing plate 15. As shown in Figure 4, the guard 21 forms a baffle opposite the annular opening 20 and is provided with a forwardly extending flange 22 arranged in spaced overlapping relation with the rear end of the annular brake flange 17.

As previously stated, the temperature of the brake construction is highly critical in obtaining efficient performance of the brake, and in accordance with this invention, the brake is effectively cooled, notwithstanding the extent to which natural circulation of air around the same is interfered with by the parts of the vehicle adjacent thereto. In each of the several embodiments of the invention about to be described, means is provided for supplying air to the brake in response to the forward motion of the vehicle, and in such a manner that as the speed of the vehicle increases, the cooling efficiency of the system also increases.

Referring first to the embodiment of the invention illustrated in Figures 1 to 4 inclusive, it will be noted that the cooling system featured in these figures comprises a unit 25 fixedly secured to the backing plate 15 at the top thereof in advance of the vertical center line passing through the axis of rotation of the wheel. The device 25 comprises a chamber 26 communicating with the atmosphere through the medium of a funnel-shaped portion 27 facing toward the front of the vehicle and positioned laterally beyond the rear side of the tire so as to receive the maximum quantity of air. The air received by the funnel-shaped portion 27 is discharged through the chamber 26 upon the exterior surface of the revoluble brake flange 17, through the medium of a relatively narrow discharge aperture 28 positioned above the brake flange 17 and extending for substantially the full width of the latter.

The above construction also provides for circulating air through the interior of the brake drum to cool the friction means, and this is accomplished in the present instance, by forming a relatively small funnel-like discharge passage 30 in the rear wall of the funnel portion 27 opposite the receiving opening of the latter. With this arrangement, it will be apparent that a certain amount of air flowing into the funnel portion 27 will be discharged through the funnel-like passage 30, and this air is conducted to the interior of the drum by means of a suitable flexible conductor 31. The discharge end of the conduit 31 communicates with the interior of the drum through the medium of an opening formed in the backing plate at the top of the latter, and any suitable means may be provided for securing the conductor to the backing plate. It may be pointed out at this time that the portion of the shield 21 substantially diametrically opposite the discharge end of the conductor 31, or in other words, the portion of the shield at the lower end of the backing plate 15 is cut away to expose the adjacent portion of the opening 20 and thereby induce the air admitted to the drum through the discharge conduit to circulate around the drum to the unobstructed portion aforesaid of the opening 20. The circulation of air through the drum to the exposed portion of the opening 20 is not only induced, because of the fact that the remaining area of the opening 20 is baffled by the shield 21, but also due to the fact that the pressure of the area in the region of the exposed portion of the opening 20 has a tendency to be less during forward motion of the vehicle than the pressure at certain other points about the circumference of the drum.

In the embodiment of the invention shown in Figures 1 to 4 inclusive, provision is also made for collecting any water that finds its way into the chamber 26 and preventing this water from escaping into the drum. The foregoing result is effected herein by forming a trap 32 in the lower portions of the chamber 26 and by providing a drain opening 33 through the bottom wall of this trap.

If desired, air may be collected from a position directly behind the cooling fan of the engine and supplied to the brakes of the vehicle to cool the latter. One manner in which the foregoing may be accomplished is shown in Figures 5 and 6. As will be observed from Figure 5, a funnel-shaped air collecting member 35 is supported in any suitable manner in rear of the cooling fan 36, so as to receive air passing through the radiator 37 of the vehicle, and this air is conducted to an air distributing chamber 38 through the medium of a flexible conduit 39. The air distributing chamber 38 is located at the brake and is secured to the backing plate 15' of the brake drum 14. The chamber 38 is provided with an elongated outlet opening 40 positioned above the brake flange 17' of the drum 14 to discharge air against the latter in substantially the same manner as the air is discharged from the opening 28 in the first described form of this invention. The chamber 38 also communicates with the interior of the brake drum through the medium of a conduit 31" and the manner in which the air is circulated through the drum is the same as previously set forth in connection with the embodiment of the invention featured in connection with Figures 1 to 4 inclusive. It will be noted from Figure 6, that the casing 38 is also provided with a trap 32' having a drain opening 33' in the bottom wall thereof permitting the escape of any water finding its way into the chamber prior to conducting the water into the brake drum. Other than the fact that the funnel 35 is disposed in a position to the rear of the cooling fan for the engine, instead of being formed integral with the casing 38, this embodiment of the invention may be considered the same in operation as the one previously set forth.

In Figures 7 to 9 inclusive, I have shown a construction wherein the air may be collected from the high pressure areas in advance of the fenders of the vehicle and discharged against the brakes of the road engaging wheels associated with the fenders. As diagrammatically shown in Figure 7, suitable casings 42 forming air receiving chambers are secured in any suitable manner beneath the fenders and are provided with intake openings 43 adapted to extend through the fenders in a position to receive air as the vehicle is being propelled in a forward direction. Each of the casings 42 communicate with a chamber 44 mounted upon the backing plate 11 of the associated brake in substantially the same position as the casing 26 described in connection with the first embodiment of this invention. The aforesaid communications are preferably established by means of flexible conduits 45 having their receiving ends secured to the casings 42 at a point spaced above the bottom walls of the latter so as to form a trap in each of the casings for collecting any moisture entering the inlet openings 43, and the aforesaid bottom walls are preferably formed with drain openings therethrough to permit the water trapped in the casings to escape. The discharge ends of the flexible conduits 45, of course, communicate with the chambers 44 so as to conduct the air received by the openings 43 to the interior of these chambers.

As shown in Figure 8, each of the chambers 44 is provided with a discharge opening 47 elongated in a circumferential direction with respect to the drum and directed toward the brake flange 17'' so as to discharge air against the latter. In addition, each of the chambers 44 is provided with outlet openings 48 adapted to register with a suitable opening 49 in the backing plate 15'' so as to also discharge air into the drum. The air discharged into the drum is circulated around the brake friction means and discharged through the portion of the opening 20'' exposed by cutting away the lower portion of the shield 21'', in the same manner as set forth in connection with the first described form of this invention.

Thus from the foregoing, it will be observed that in each of the several embodiments of the invention, provision is made for collecting air from the high pressure areas created by forward motion of the vehicle and discharging a quantity of this air upon the exterior of the brake flanges as the latter are revolved. It will further be apparent that in each of the modifications selected herein for the the purpose of illustrating this invention, provision is also made for discharging a quantity of air into the brake drum and for circulating this air throughout the brake drum around the friction means. It will, of course, be understood that reasonably satisfactory results may be secured with a construction designed to effect either of the above results and, consequently, the present invention contemplates such an arrangement.

Referring now to the embodiment of the invention illustrated in Figure 10, it will be noted that this construction differs from the constructions previously described, in that an auxiliary or blower unit 50 is provided in the engine compartment of the vehicle for forcing air under pressure into the air distributing chambers 51 associated with the brakes of the vehicle. The chambers 51 may be identical in construction to the ones shown in Figure 8, and in the present instance communicate with the discharge side of the blower through the medium of a conduit 52 and a funnel-shaped receiving member 53. With this type of construction, the circulation of a liberal quantity of air in the region of the brakes is insured, even though the vehicle is being propelled at a relatively slow rate.

Attention is also directed to the fact that cooling the brake in accordance with the principle involved in any one of the several modifications, not only appreciably increases the efficiency of operation of the brake, but also renders it possible to utilize stamped brake drums, instead of the expensive composite drums found necessary in the past to obtain the thermal conductivity required to maintain the operating temperature of the brakes within reason. Moreover, by utilizing the feature of applicant's invention which provides for discharging air into the interior of the drum, the latter will be maintained relatively clean, since the air will serve to blow out any dirt or abrasive material accumulating within the drums.

What I claim as my invention is:

1. A brake construction for the road engaging wheels of a motor vehicle, comprising a drum having a brake flange, brake friction means housed within the drum and engageable with the inner surface of the brake flange, means for collecting air from high pressure areas in advance of the vehicle created by forward motion thereof, and means for directing a portion of the air against the outer surface of the brake flange and for circulating another portion of the air throughout the interior of the drum.

2. A brake construction for the road engaging wheels of a motor vehicle, comprising a revoluble drum having an annular brake flange, brake friction means within the drum and engageable with the inner annular surface of the flange, means for mounting the friction means in the drum including a backing plate closing the open side of the drum and fixed against rotation, means mounted on said plate having a portion fashioned to collect air upon forward motion of the vehicle and having another portion directing the air collected against the brake drum.

3. A brake construction for the road engaging wheels of a motor vehicle, comprising a revoluble drum having an annular brake flange, brake friction means within the drum and engageable with the inner annular surface of the flange, means for mounting the friction means in the drum including a backing plate closing the open side of the drum and fixed against rotation, means mounted on said plate having a portion for collecting air from a high pressure area created by the forward motion of the vehicle and having another portion for discharging a quantity of the air thus collected against the revoluble brake flange.

4. A brake construction for the road engaging wheels of a motor vehicle, comprising a revoluble drum having an annular brake flange, brake friction means within the drum and engageable with the inner annular surface of the flange, means for mounting the friction means in the drum including a backing plate closing the open side of the drum and fixed against rotation, means mounted on said plate having a portion for collecting air from a high pressure area created by forward motion of the vehicle and having another portion for discharging a quantity of the air thus collected against the revoluble brake flange, and means for also discharging a quantity of said air into the drum.

5. A brake construction for the road engaging wheels of a motor vehicle, comprising a revoluble drum having an annular brake flange, brake friction means within the drum and engageable with the inner annular surface of the flange, means for mounting the friction means in the drum including a backing plate closing the open side of the drum and fixed against rotation, a cooling system for the brake including an air distributing chamber mounted upon the backing plate in communication with the interior of the drum through the backing plate and having a discharge opening positioned to discharge air against the outer surface of the revoluble brake flange, and means communicating with the chamber to supply air thereto including an air collecting device located in a position to receive air from a high pressure area created by forward motion of the vehicle.

6. A brake construction for the road engaging wheels of motor vehicles, comprising a drum having an annular brake flange, brake friction means supported within the drum and engageable with the inner annular surface of the flange, means mounting the friction means in the drum including a backing plate closing the open side of the drum and having the periphery thereof spaced from the adjacent portions of the drum to form an annular opening, a shield for the opening fixed to the backing plate and having a portion cut away adjacent the lower end thereof to expose a portion of the annular opening, and means for collecting air from a high pressure area created by forward movement of the vehicle and for discharging the air into the brake drum at a point adjacent the top thereof.

7. A brake construction for the road engaging wheels of a motor vehicle, comprising a revoluble drum having an annular brake flange, brake friction means within the drum and engageable with the inner annular surface of the flange, means for mounting the friction means in said drum including a backing plate closing the open side of the drum and fixed against rotation, a cooling system for the brake including an air distributing chamber mounted upon the backing plate, said air distributing chamber having a discharge opening directed toward the brake drum and having a sediment collecting portion disposed below the discharge opening, and means for collecting air from a high pressure area created by forward motion of the vehicle and communicating with said chamber at a point above the sediment collecting portion aforesaid.

8. A brake construction for the road engaging wheels of a motor vehicle, comprising a revoluble drum having an annular brake flange, brake friction means supported within the drum and engageable with the inner annular surface of the brake flange, means supporting the friction means in the drum including a backing plate closing the open side of the drum and fixed against rotation, a cooling system for the brake including an air distributing chamber mounted upon the backing plate in communication with the interior of the drum through the backing plate and having a discharge opening directed toward the outer surface of the brake flange, said distributing chamber having a portion located at an elevation below the discharge opening to collect sediment and moisture finding its way into the distributing chamber, and an air collecting device located in a position to receive air by a forward motion of the vehicle and communicating with said distributing chamber above the sediment collecting portion thereof.

9. A brake construction for the road engaging wheels of a motor vehicle, comprising a revoluble drum having an annular brake flange, brake friction means within the drum and engageable with the inner annular surface of the flange, means for mounting the friction means in the drum including a backing plate closing the open side of the drum and fixed against rotation, a cooling system for the brake including an air distributing chamber mounted upon the backing plate and having a portion facing the forward end of the vehicle to collect air upon movement of the vehicle in a forward direction, said distributing chamber also having a discharge opening directed toward the drum and having a portion located below the discharge opening for collecting sediment that may be suspended in the air collected by the portion aforesaid of the distributing chamber.

10. In a brake drum cooling device, the combination with a brake drum and a backing plate for said brake drum, of a scoop secured to said backing plate and extending over said brake drum, said scoop being flared toward its front end and having a portion at its front end located axially in an inboard direction beyond said brake drum, said portion being open for the flow of air into said scoop.

11. In a brake drum cooling device, the combination with a brake drum having external cooling projections and a backing plate for said brake drum, of a scoop secured to said backing plate and having a portion extending over said brake drum and a portion located axially in an inboard direction beyond said brake drum, said last mentioned portion being flared toward its front end, both of said portions having their front ends open for the flow of air into said scoop, and means upon said scoop for directing the air toward said cooling projections.

12. In a brake drum cooling device, the combination with a brake drum and a backing plate for said brake drum, of a scoop secured to said backing plate and having a portion extending over said brake drum for directing air against the latter, said scoop having an opening at its front end and converging rearwardly toward and having its rear end spaced from said brake drum.

13. A brake construction for the road engaging wheels of a motor vehicle equipped with a radiator at the front end of the same and with a cooling fan in rear of the radiator, comprising a revoluble brake drum having an annular brake flange, friction means within the drum engageable with the inner annular surface of said flange, means mounting the friction means in the drum including a backing plate closing the open side of the drum and fixed against rotation, an air distributing chamber mounted upon the backing plate in communication with the interior of the drum through the backing plate and having a discharge opening directed toward the exterior surface of the brake flange, and means communicating with the chamber to supply air thereto including an air collecting device located in a position in rear of the cooling fan to receive air from the stream created by said fan.

14. A brake construction for the road engaging wheels of a motor vehicle equipped with a cooling radiator at the forward end and with a fan located in rear of the radiator, comprising a drum having an annular brake flange, brake friction means housed within the drum and engageable with the inner annular surface of the brake flange, and means for collecting air from the stream created by the fan and for directing the air toward the brake drum to cool the latter.

CHARLES S. ASH.